United States Patent
Chen et al.

(10) Patent No.: US 10,994,734 B2
(45) Date of Patent: May 4, 2021

(54) METHODS AND SYSTEM FOR CONTROLLING LAUNCH OF A VEHICLE HAVING AN AUTOMATIC TRANSMISSION

(71) Applicant: Ford Global Technologies, LLC, Dearborn, MI (US)

(72) Inventors: Weitian Chen, Windsor (CA); Yang Xu, Dearborn, MI (US); Zhengyu Dai, Canton, MI (US); Stuart N. Ford, Farmington Hills, MI (US); Qi Wang, Novi, MI (US); Hong Jiang, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 16/435,205

(22) Filed: Jun. 7, 2019

(65) Prior Publication Data

US 2020/0385000 A1    Dec. 10, 2020

(51) Int. Cl.
*B60W 10/06*    (2006.01)
*B60W 30/18*    (2012.01)
(Continued)

(52) U.S. Cl.
CPC .... *B60W 30/18027* (2013.01); *B60W 10/026* (2013.01); *B60W 10/06* (2013.01); *B60W 30/188* (2013.01); *B60W 2050/001* (2013.01); *B60W 2050/0012* (2013.01); *B60W 2050/0022* (2013.01); *B60W 2510/0241* (2013.01); *B60W 2520/10* (2013.01); *B60W 2540/10* (2013.01); *B60W 2710/027* (2013.01); *B60W 2710/0605* (2013.01); *B60W 2710/0666* (2013.01)

(58) Field of Classification Search
CPC .............. Y10T 477/79; Y10T 477/735; Y10T 477/635; B60W 30/18027; B60W 30/188; B60W 10/06; B60W 10/026; B60W 2540/10; B60W 2710/0605; B60W 2050/0022; B60W 2520/10; B60W 2510/0241; B60W 2050/001; B60W 2710/0666; B60W 2710/027
USPC ......................................................... 701/68
See application file for complete search history.

(56) References Cited

U.S. PATENT DOCUMENTS 4,582,185 A    4/1986  Grimes et al.
6,974,402 B2   12/2005 Colvin et al.
(Continued)

FOREIGN PATENT DOCUMENTS

EP    2843266 A1    3/2015

OTHER PUBLICATIONS

Chen, W. et al., "Methods and System for Controlling Launch of a Hybrid Vehicle," U.S. Appl. No. 16/240,564, filed Jan. 4, 2019, 34 pages.

*Primary Examiner* — Roger L Pang
(74) *Attorney, Agent, or Firm* — Vincent Mastrogiacomo; McCoy Russell LLP

(57) ABSTRACT

Systems and methods for operating a driveline of a vehicle that includes an automatic transmission and a torque converter are described. In one example, vehicle launch is controlled according to a linear quadratic regulator that provides feedback control according to torque converter slip error and vehicle speed error. The vehicle launch is also controlled according to feed forward control that is based on requested torque converter slip and requested vehicle speed.

19 Claims, 4 Drawing Sheets

(51) Int. Cl.
*B60W 10/02* (2006.01)
*B60W 30/188* (2012.01)
*B60W 50/00* (2006.01)

(56) References Cited

U.S. PATENT DOCUMENTS

| | | |
|---|---|---|
| 8,109,857 B2 | 2/2012 | Roses et al. |
| 8,489,298 B2 * | 7/2013 | Otanez ................ F16H 61/143 477/166 |
| 2004/0162184 A1 * | 8/2004 | Segawa ................ F16H 61/143 477/62 |
| 2008/0076635 A1 | 3/2008 | Lee et al. |
| 2009/0093339 A1 * | 4/2009 | Chen ................... F16H 61/143 477/61 |
| 2015/0330505 A1 * | 11/2015 | Kusabe ................ F16H 61/143 701/68 |
| 2016/0297418 A1 * | 10/2016 | Zhang .................. B60W 10/10 |
| 2017/0248090 A1 * | 8/2017 | Fukuda ................ F02D 31/003 |

\* cited by examiner

METHODS AND SYSTEM FOR CONTROLLING LAUNCH OF A VEHICLE HAVING AN AUTOMATIC TRANSMISSION

FIELD

The present description relates to methods and a system for launching a vehicle that includes an automatic transmission from rest or a low vehicle speed.

BACKGROUND AND SUMMARY

A vehicle may include an internal combustion engine, a torque converter, and a step ratio automatic transmission to propel the vehicle. Control of the internal combustion engine, torque converter, and step ratio automatic transmission may be provided via individual controllers for each of the devices. Individual control of these devices may be adequate at times, but it may be difficult to provide more optimal performance of the entire driveline because of tradeoffs made during a complex calibration process whereby each controller is tuned to provide a desired level of vehicle performance. This may be precisely the case during vehicle launch conditions when engine efficiency, driveline noise and vibration, and vehicle acceleration metrics may be influenced by tuning of the engine controller, and torque converter controller. For example, an increase in engine speed to increase engine efficiency may lead to additional torque converter slip, thereby reducing overall driveline efficiency. Therefore, it may be desirable to provide controlling the engine and torque converter in a way that simplifies controller calibration while providing a high level of controller and driveline performance.

The inventors herein have recognized the above-mentioned issues and have developed a driveline operating method, comprising: adjusting torque converter clutch torque capacity and engine torque during a vehicle launch via a controller subject to a cost function comprising a torque converter slip error and a vehicle speed error.

By adjusting torque converter clutch capacity and engine torque responsive to a cost function comprising a torque converter slip error and a vehicle speed error, it may be easier to achieve a desired vehicle launch. In particular, the cost function as basis of a linear quadratic regulator (LQR) may simplify vehicle calibration since relationships between engine torque and torque converter slip are unified via the LQR. The person or machine that is calibrating the vehicle according to vehicle performance objectives need not know how engine torque is related to torque converter slip to provide a requested vehicle performance level.

The present description may provide several advantages. In particular, the approach may improve vehicle launch control. Further, the approach may simplify vehicle calibration to achieve requested vehicle performance objectives. In addition, the approach may reduce vehicle cost via reducing vehicle calibration complexity.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to operating a driveline of a vehicle. In particular, the present description is related to improving vehicle launch of a vehicle and reducing controller calibration complexity. The driveline may include an engine of the type shown in FIG. 1. The driveline may be configured as shown in FIG. 2. The vehicle may include the controller illustrated in the block diagram of FIG. 3. The driveline may be operated via the method of FIG. 4.

Figure 1:
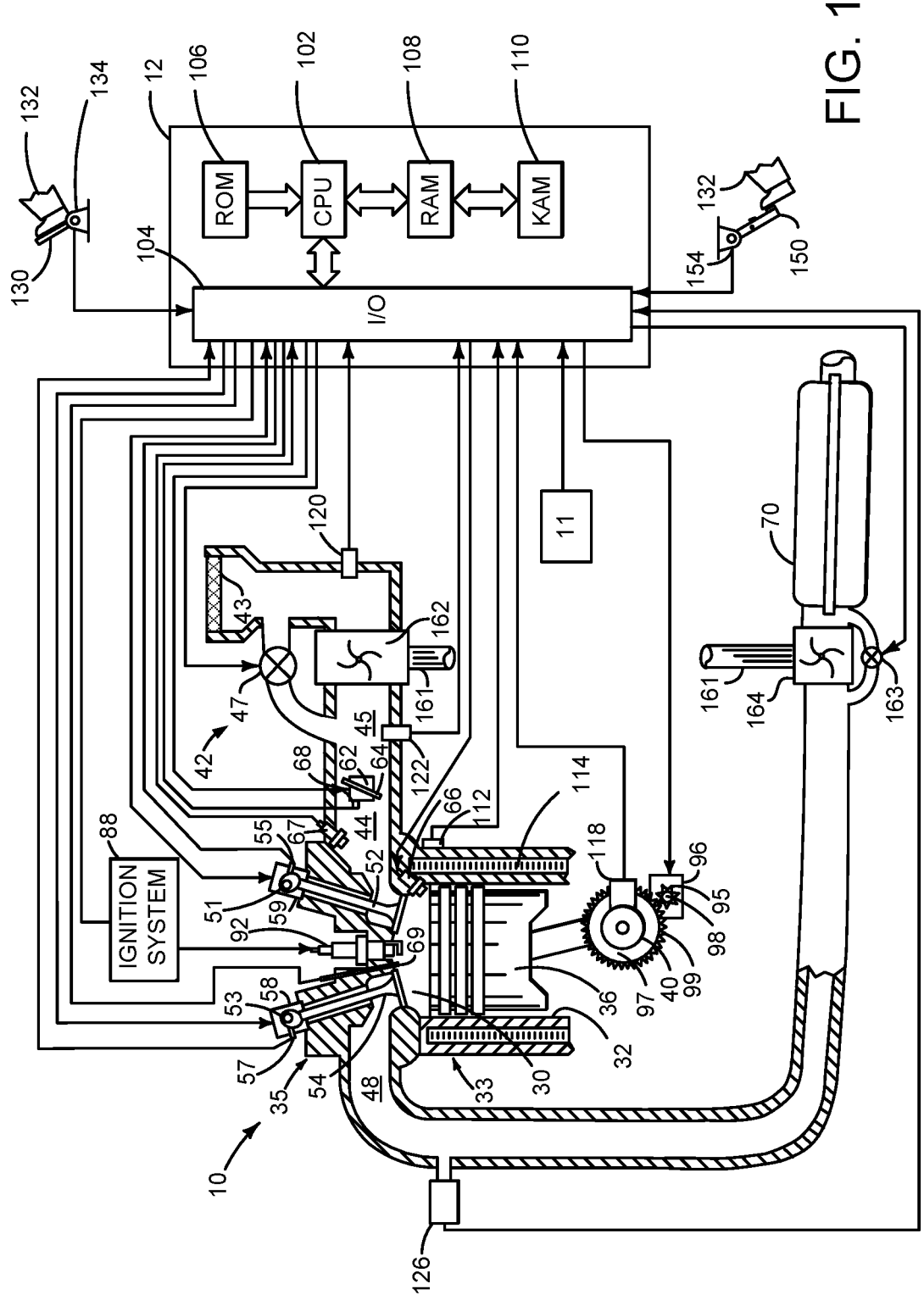
FIG. 1 is a schematic diagram of an engine.
Figure 2:
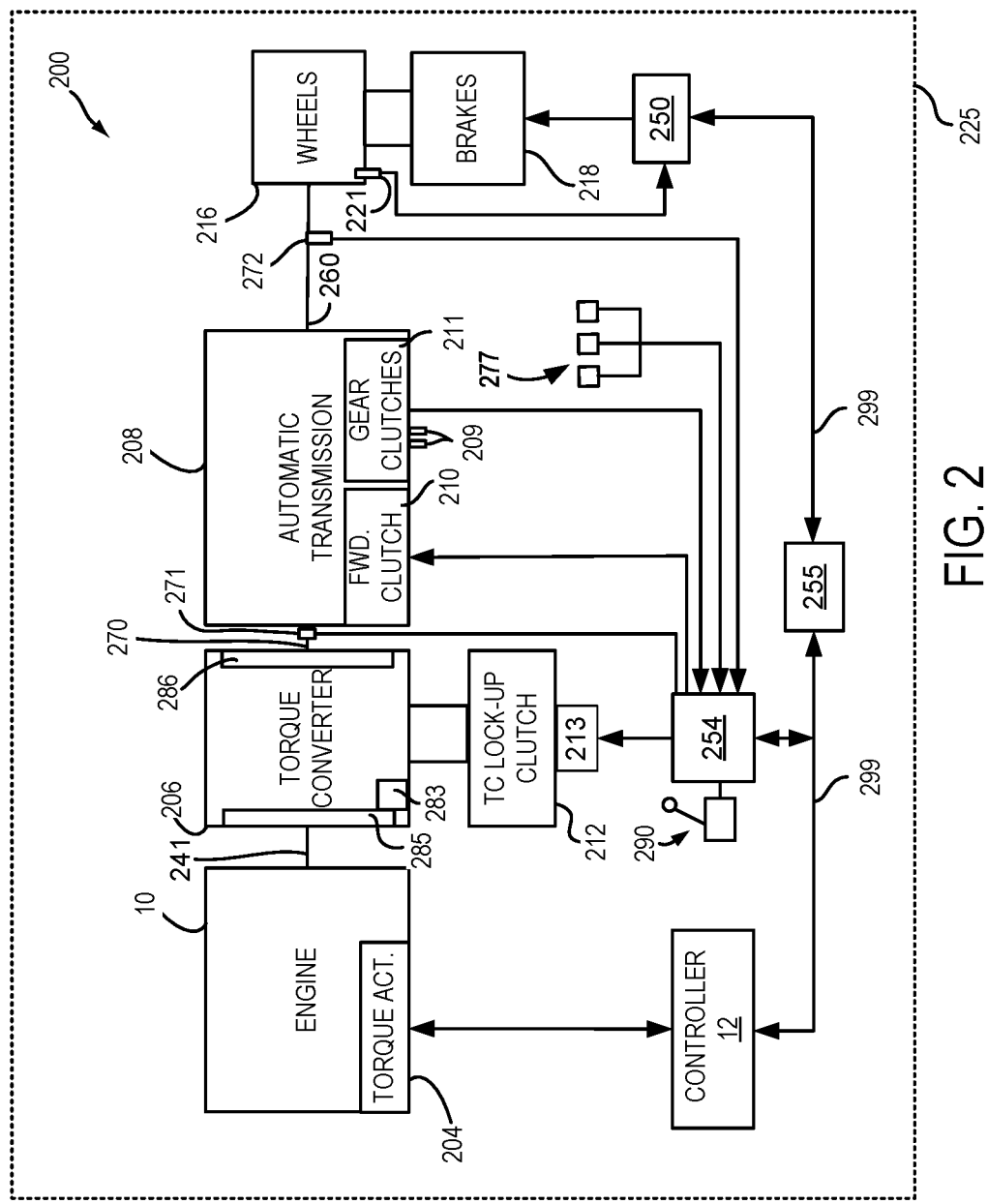
FIG. 2 is a schematic diagram of a vehicle driveline that includes an automatic transmission.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2 and employs the actuators shown in FIGS. 1 and 2 to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst filter 70 can include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, transmission controller 254, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, and information regarding degraded brakes). Further, the vehicle system controller 255 may provide commands to engine controller 12, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a braking power from engine controller 12. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, transmission controller 254, and brake controller 250. Alternatively, the vehicle system controller 255 and the engine controller 12 may be a single unit while the transmission controller 254 and the brake controller 250 are standalone controllers.

Power of engine 10 may be adjusted via power actuator 204, such as a fuel injector, throttle, etc. An engine output power may be transmitted to torque converter 206 via shaft 241. Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly relayed to the transmission to be adjusted. The transmission controller 254 may be configured to adjust the amount of power transmitted by torque converter 212 by adjusting the torque converter lock-up clutch via actuator 213 in response to various engine operating conditions, or based on a driver-based engine operation request. Torque converter 206 also includes pump 283 that pressurizes fluid to operate forward clutch 210 and gear clutches 211. Pump 283 is driven via impeller 285.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates the requested driver demand power to the engine. Vehicle system controller 255 requests the engine power from engine controller 12. Transmission controller 254 selectively locks torque converter clutch 212 and engages gears via gear clutches 211 in response to shift schedules and TCC lockup schedules that may be based on input shaft power and vehicle speed.

In response to a request to decelerate vehicle 225, vehicle system controller may provide a negative desired wheel power (e.g., desired or requested powertrain wheel power) based on vehicle speed and brake pedal position. Vehicle system controller 255 then allocates a fraction of the negative desired wheel power to the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 may supply a negative power to transmission input shaft 270, but negative power provided by engine 10 may be limited by transmission controller 254 which outputs a transmission input shaft negative power limit (e.g., not to be exceeded threshold value). Accordingly, power control of the various powertrain components may be supervised by vehicle system controller 255 with local power control for the engine 10, transmission 208, and brakes 218 provided via engine controller 12, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors.

If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), gear shift lever sensors, and ambient temperature sensors. Transmission controller 254 may also receive requested gear input from gear shift selector 290 (e.g., a human/machine interface device). Gear shift lever may include positions for gears 1-N (where N is the an upper gear number), D (drive), and P (park)

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an engine; a torque converter including a torque converter clutch, the torque converter coupled to the engine; and a controller including executable instructions stored in non-transitory memory to adjust engine torque and a torque capacity of the torque converter clutch based on a feed forward adjustment and a feedback adjustment, the feedback adjustment based on minimizing a cost function. The system includes where the feed forward adjustment is based on a requested torque converter slip and a requested vehicle speed. The system includes where the cost function is responsive to a torque converter slip error and a vehicle speed error. The system includes where the cost function includes two integrations. The system includes where the torque converter slip error is a difference between actual torque converter slip and a requested torque converter slip.

Figure 3:
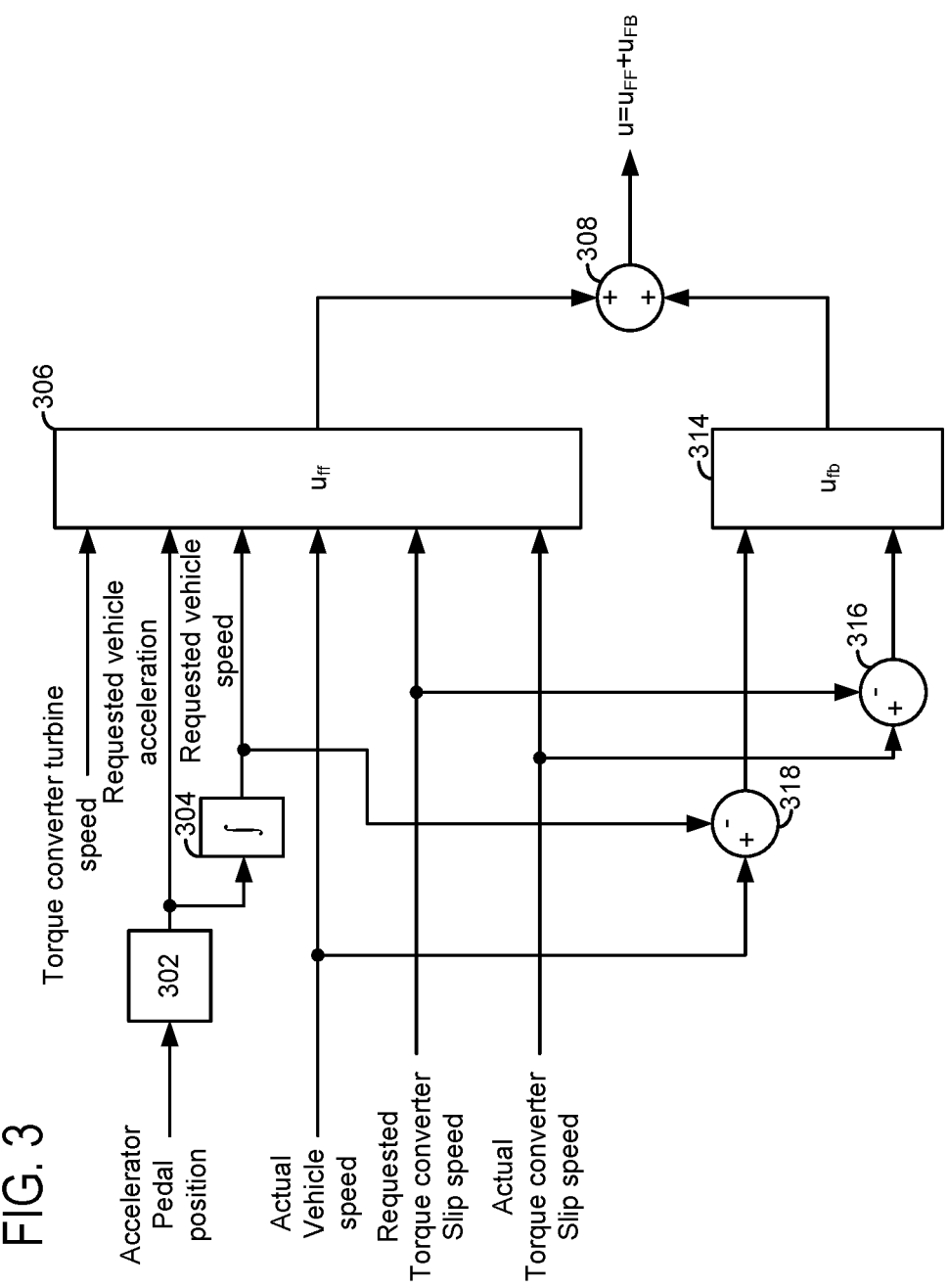
FIG. 3 shows a driveline controller block diagram.

Referring now to FIG. 3, a block diagram of a vehicle launch (e.g., vehicle acceleration from a vehicle speed that is less than a threshold speed, such as a vehicle launch from zero vehicle speed) controller 300 is shown. The vehicle launch controller may be incorporated into the system of FIGS. 1 and 2 as part of the method of FIG. 4 and as executable instructions stored in non-transitory memory. The vehicle launch controller may receive input from the sensors shown in FIGS. 1 and 2. The vehicle launch controller may operate the actuators shown in FIGS. 1 and 2 to launch a vehicle.

Accelerator pedal position is input to block 302 where it is applied to reference a table or a function that returns an empirically determined requested vehicle acceleration rate. In one example, the empirically determined values may be determined via operating a vehicle on a chassis dynamometer and evaluating whether or not vehicle acceleration values as provided from output of the tables and/or functions meet expectation levels for a level of accelerator pedal input. If the vehicle acceleration does not meet expectation levels for an accelerator input level, then the vehicle acceleration rate may be increased for the accelerator input level. Conversely, if the vehicle acceleration exceeds expectation levels for the accelerator input level, then the vehicle acceleration rate may be decreased. The requested vehicle acceleration is input into block 304 and block 306. The vehicle acceleration is integrated at block 304 and block 304 outputs a requested vehicle speed. The requested vehicle speed is input to block 306 and junction 318. At junction 318, the requested vehicle speed is subtracted from the actual vehicle speed and the result (e.g., vehicle speed error) is input to block 314. Actual vehicle speed, torque converter turbine speed, requested torque converter slip speed, and actual torque converter slip speed (e.g., torque converter impeller speed minus torque converter turbine speed) are also input to block 306. The requested torque converter slip speed is subtracted from the actual torque converter slip speed at junction 316, which outputs a torque converter slip speed error to block 314.

Block 306 outputs a feed forward control demand that is based on torque converter turbine speed, requested vehicle speed, requested vehicle acceleration, actual vehicle speed, requested torque converter slip speed, and actual torque converter slip speed. The feed forward control may be expressed as:

$$u_{ff} = -B^{-1}\left(f - \left(\frac{\frac{d\omega_{slip}^*}{dt}}{\frac{dV_{veh}^*}{dt}}\right) + A\left(\begin{array}{c}\omega_{slip}^*\\V_{veh}^*\end{array}\right)\right)$$

where $u_{ff}$ is the feed forward command, $B^{-1}$ is an inverse B matrix, f is a matrix, A is a matrix, $\omega^*_{slip}$ is a target or requested torque converter slip speed (e.g., torque converter impeller speed minus torque converter turbine speed), and $V^*_{veh}$ is a target vehicle speed. The specific details for the B, A, and f matrices are described in the method of FIG. 4. The feed forward command is input to junction 308 where it is added to the feedback command.

Block 314 outputs the feedback command which is based on the torque converter slip error and the vehicle speed error. In particular, the feedback command may be expressed as:

$$u_{fb} = -R^{-1}B^T P\left(\begin{array}{c}\tilde{\omega}_{slip}\\\tilde{V}_{veh}\end{array}\right)$$

where $u_{fb}$ is the feedback command, $R^{-1}$ is an inverse of the R matrix, $B^T$ is the transpose of the B matrix, P is the P matrix, $\tilde{\omega}_{slip}$ is the torque converter slip error, and $\tilde{V}_{veh}$ is the vehicle speed error. The specific details for the R, B, and P matrices are described in the method of FIG. 4. The feedback command is input to junction 308 where it is added to the feed forward command.

The control command u is the output of junction 308 and it may be expressed as:

$$u = \begin{pmatrix}u1\\u2\end{pmatrix} = \begin{pmatrix}T_{eng}\\T_{TCC}\end{pmatrix} = u_{ff} + u_{fb}$$

where u is the control command, u1 is the contents of the (row1:column1) cell of matrix u, u2 is contents of the (row2:column1) cell of matrix u, $T_{eng}$ is the engine torque command and $T_{TCC}$ is the torque converter clutch torque capacity command (e.g., amount of torque the torque converter clutch may transfer), $u_{fb}$ is the feedback command, and $u_{ff}$ is the feed forward command. The engine and TCC torque commands request torques from the engine and TCC. Engine torque is adjusted via a torque actuator (e.g., throttle, spark timing, fuel injection, cam timing, etc.) and TCC torque capacity is adjusted via a torque converter clutch actuator.

Figure 4:
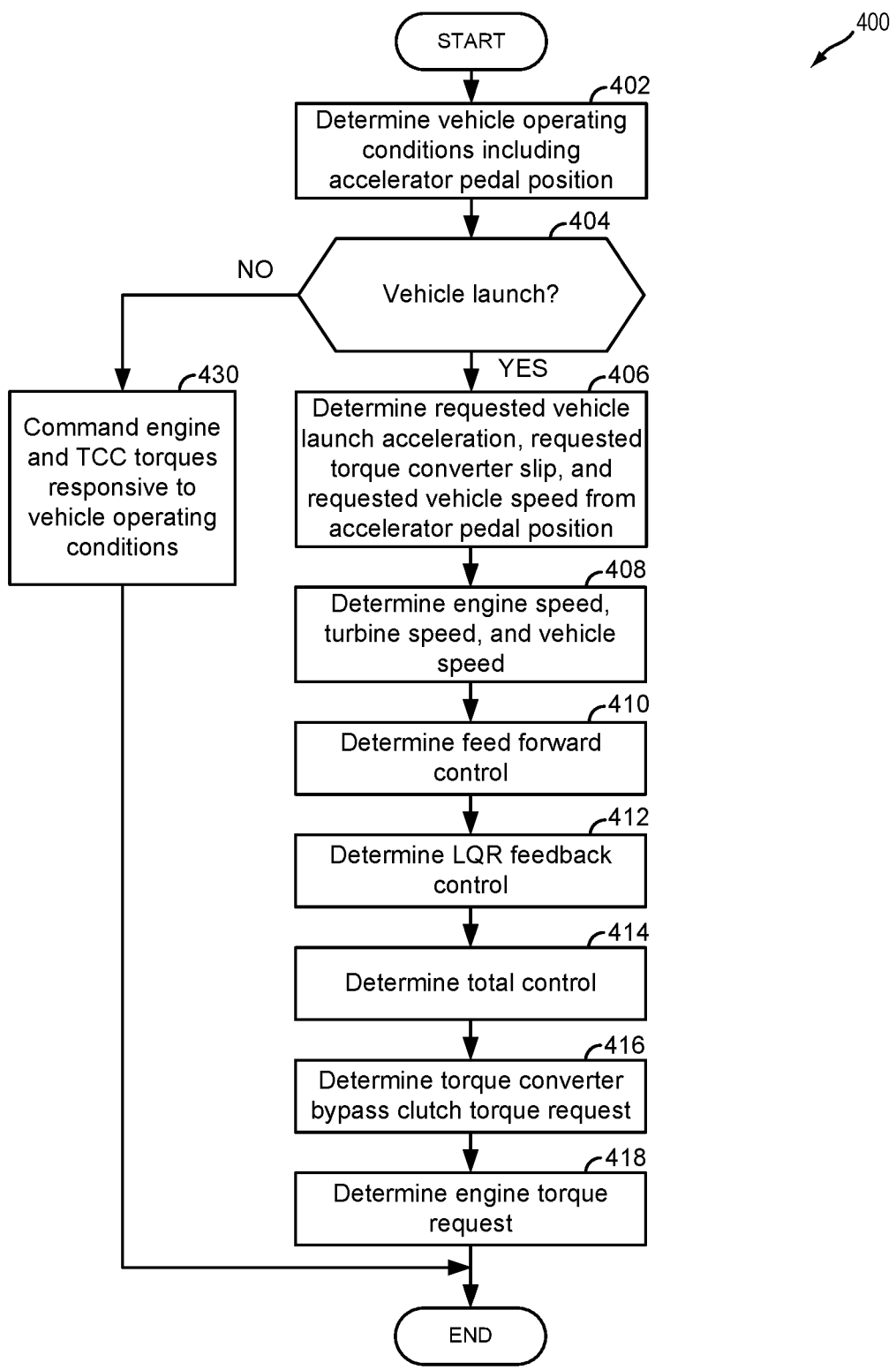
FIG. 4 shows a method for operating a driveline of a vehicle.

Referring now to FIG. 4, a flow chart of a method for operating a driveline to improve vehicle launch is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world. The driveline disconnect clutch is fully closed when the method of FIG. 4 is being performed.

At 402, method 400 determines vehicle operating conditions. Vehicle operating conditions may include but are not limited to vehicle speed, engine speed, engine temperature, and accelerator pedal position. Method 400 proceeds to 404.

At 404, method 400 judges if the vehicle is presently being launched. In one example, method 400 may judge that the vehicle is being launched if the accelerator pedal position is greater than a threshold and vehicle speed is less than a threshold speed. In other examples, method 400 may judge that the vehicle is launching based on other conditions. If method 400 judges that the vehicle is being launched, then the answer is yes and method 400 proceeds to 406. Otherwise, the answer is no and method 400 proceeds to 430.

At 430, method 400 commands the engine, ISG, and TCC responsive to vehicle operating conditions including, but not limited to accelerator pedal position, vehicle speed, engaged transmission gear, and battery state of charge as is known in the art. Method 400 proceeds to exit.

At 406, method 400 determines requested vehicle launch acceleration, a requested vehicle speed, and a requested torque converter slip. In one example, accelerator pedal position is applied to reference a table or function that outputs empirically determined values of requested vehicle launch acceleration. The requested vehicle speed may be determined via integrating the requested vehicle launch acceleration. The requested torque converter slip may be determined via a table or function that is referenced via accelerator pedal position and presently engaged transmission gear. Method 400 proceeds to 408.

At 408, method 400 determines actual engine speed, vehicle speed, and turbine speed from the various driveline sensors. Method 400 proceeds to 410.

At 410, method 400 determines a combined feed forward torque that includes torque for the torque converter bypass clutch and engine torque. The feed forward torque may be expressed as:

$$u_{ff} = -B^{-1}\left(f - \begin{pmatrix} \frac{d\omega^*_{slip}}{dt} \\ \frac{dV^*_{veh}}{dt} \end{pmatrix} + A\begin{pmatrix} \omega^*_{slip} \\ V^*_{veh} \end{pmatrix}\right)$$

where $u_{ff}$ is the feed forward torque value, B is a matrix that may be expressed as:

$$B = \begin{pmatrix} \frac{1}{J_{eff,imp}} & \frac{-1}{J_{eff,imp}} \\ 0 & \frac{GR_1 \cdot FDR}{m_{eff,veh} \cdot T_{wheel}} \end{pmatrix}$$

f is a matrix that may be expressed as:

$$f = \begin{pmatrix} \frac{-1}{J_{eff,imp}} \cdot T_{imp} - \frac{d\omega_{trb}}{dx} \\ \frac{GR_1 \cdot FDR}{m_{eff,veh} \cdot T_{trb}} \cdot T_{trb} - \frac{1}{m_{eff,veh}(F_0 + F_2 \cdot V^2_{veh})} \end{pmatrix}$$

A is a matrix that may be expressed as:

$$A = \begin{pmatrix} 0 & 0 \\ 0 & \frac{-F_1}{m_{eff,veh}} \end{pmatrix}$$

where $\omega^*_{slip}$ is a target or requested torque converter slip speed (e.g., torque converter impeller speed minus torque converter turbine speed), where $V^*_{veh}$ is a target vehicle speed, where $J_{eff,imp}$ is the effective torque converter impeller inertia, which may be expressed as: $J_{eff,imp} = J_{eng} + J_{imp} + J_{ISG} + J_{up,other}$, were $J_{eng}$ is the engine inertia, $J_{imp}$ it the torque converter impeller inertia, $J_{ISG}$ is the ISG inertia, and $J_{up,other}$ is the inertia of a dual mass flywheel, driveline disconnect clutch etc. The variable $m_{eff,veh}$ may be expressed as:

$$m_{eff,veh} = \left(J_{trb} + J_{trans} + \frac{J_{FD,up}}{GR_1} + \frac{J_{FD,down}}{GR_1(FDR)^2}\right)\left(\frac{GR_1 \cdot FDR}{r_{wheel}}\right)^2 + \left(m_{veh} + 4\frac{J_{wheel}}{r^2_{wheel}}\right),$$

where $J_{trb}$ is the torque converter turbine inertia, $J_{trans}$ is the transmission inertia, $J_{FD,up}$ is the inertia of the driveline from the transmission output shaft to the differential, $GR_1$ is the transmission first gear ratio, $J_{FD,down}$ is the inertia of the driveline from the differential to the axle half shaft, FDR is the final drive ratio (e.g., axle ratio), $r_{wheel}$ is the wheel radius, $m_{veh}$ is the mass of the vehicle, $J_{wheel}$ is the inertia of the wheel, and $F_0$, $F_1$, and $F_2$ are road load coefficients. Method 400 proceeds to 412.

At 412, method 400 determines linear quadratic regular feedback control. In one example, the feedback control is provided via the following equation:

$$u_{FB} = -R^1 B^T P\begin{pmatrix} \tilde{\omega}^*_{slip} \\ \tilde{V}^*_{veh} \end{pmatrix}$$

where $u_{FB}$ is the feedback control column vector comprising $\tilde{\omega}_{slip}$ is the torque converter slip error, which may be expressed as $\tilde{\omega}_{slip} = \omega_{slip} - \omega^*_{slip}$ (where $\omega_{slip}$ is the actual torque converter slip and where $\omega^*_{slip}$ is the requested torque converter slip), and $\hat{V}_{veh}$ is the vehicle speed error, which may be expressed as $\tilde{V}_{vdh}=V_{veh}-{}^*V_{veh}$ (where $V_{veh}$ is the actual vehicle speed and $V^*_{veh}$ is the requested vehicle speed).

The feedback control is derived from optimizing the cost function $$C = \int_0^\infty \left(\frac{\tilde{\omega}_{slip}}{\tilde{V}_{veh}}\right) Q \left(\frac{\tilde{\omega}_{slip}}{\tilde{V}_{veh}}\right) + \int_0^\infty u_{FB}^T \cdot R \cdot u_{FB} \cdot dt,$$

where positive matrices Q>0, R>0 can be chosen by the control designers and calibrators. If a better torque slip speed error and vehicle speed error is desired, Q can be chosen with large eigenvalues. If one would like to limit the feedback control effort, R can be chosen with large eigenvalues. The proper choices of Q and R allow the proper trade-off between vehicle launch performance and the feedback control effort required.

The positive matrix P is the solution of the matrix equation $PA+A^TP+Q-PBR^{-1}B^TP=0$, which is immediately available from using commercial software tools and generates scalar controller gains that minimize the cost function C. Method 400 proceeds to 414.

At 414, method 400 determines the total control. The total control may be expressed as:

$$u = \begin{pmatrix} u_1 \\ u_2 \end{pmatrix} = \begin{pmatrix} T_{eng} \\ T_{TCC} \end{pmatrix} = u_{FF} + u_{FB}$$

where u is the total control, $u_1=T_{eng}$, $u_2=T_{TCC}$, $T_{eng}$ is engine torque and $T_{TCC}$ is torque converter clutch torque capacity. Method 400 proceeds to 416.

At 416, method 400 determines the torque converter clutch torque capacity request. The torque converter clutch torque capacity request is u2. Method 400 proceeds to 418.

At 420, method 400 determines the engine torque request. The engine torque is $u_1$. Method 400 proceeds to exit.

In this way, engine torque and torque converter clutch torque capacity may be determined in unison so that adjusting one of these torque requests during a vehicle launch does not have unexpected influence on the other torque requests.

Thus, the method of FIG. 4 provides for a driveline operating method, comprising: adjusting torque converter clutch torque capacity and engine torque during a vehicle launch via a controller subject to a cost function comprising a torque converter slip error and a vehicle speed error. The method includes where the cost function may be expressed as a sum of a first integration and a second integration. The method includes where the first integration includes integration of torque converter slip speed error and vehicle speed error. The method includes where the second integration is an integration including a feedback matrix. The method further comprises minimizing the cost function via controller scaler parameters. The method includes where the cost function is minimized via a feedback control gain matrix. The method further comprises adjusting the torque converter clutch torque capacity and engine torque responsive to a feed forward control command. The method includes where the vehicle speed error is based on accelerator pedal position.

The method of FIG. 4 also provides for a driveline operating method, comprising: via a controller, adjusting a torque converter clutch torque capacity and an engine torque in response to a vehicle speed error based on an accelerator pedal position and an actual vehicle speed; and adjusting the torque converter torque capacity and the engine torque capacity in response to a torque converter slip speed error. The method includes where the engine torque is adjusted via adjusting a position of a throttle. The method includes where the torque converter clutch torque capacity is adjusted in further response to a feed forward variable and a feedback variable. The method includes where the feed forward variable is based on a requested torque converter slip and a requested vehicle speed. The method includes where the vehicle speed error is a difference between the actual vehicle speed and a requested vehicle speed, where the requested vehicle speed is based on the accelerator pedal position. The method includes where the feedback variable is based on the vehicle speed error and a torque converter slip error. The method includes where the torque converter slip error is a difference between actual torque converter slip and a requested torque converter slip, and where the requested torque converter slip is based on the accelerator pedal position.

In another representation, the method includes a driveline operating method, comprising: via a controller, adjusting a torque converter clutch torque capacity and an engine torque in response to a vehicle speed error based on an accelerator pedal position and an actual vehicle speed; adjusting the torque converter torque capacity and the engine torque capacity in response to a torque converter slip speed error; and further adjusting the torque converter clutch torque capacity and the engine torque in response to a requested vehicle acceleration and a requested vehicle speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A driveline operating method, comprising:
adjusting torque converter clutch torque capacity and engine torque during a vehicle launch via a controller subject to a cost function comprising a torque converter slip error and a vehicle speed error.

2. The method of claim 1, where the cost function may be expressed as a sum of a first integration and a second integration.

3. The method of claim 2, where the first integration includes integration of torque converter slip speed error and vehicle speed error.

4. The method of claim 2, where the second integration is an integration including a feedback matrix.

5. The method of claim 1, further comprising minimizing the cost function via controller scaler parameters.

6. The method of claim 1, where the cost function is minimized via a feedback control gain matrix.

7. The method of claim 1, further comprising adjusting the torque converter clutch torque capacity and engine torque responsive to a feed forward control command.

8. The method of claim 1, where the vehicle speed error is based on accelerator pedal position.

9. A driveline operating method, comprising:
via a controller, adjusting a torque converter clutch torque capacity and an engine torque in response to a vehicle speed error based on an accelerator pedal position and an actual vehicle speed; and
adjusting the torque converter torque capacity and the engine torque in response to a torque converter slip speed error.

10. The method of claim 9, where the engine torque is adjusted via adjusting a position of a throttle.

11. The method of claim 9, where the torque converter clutch torque capacity is adjusted in further response to a feed forward variable and a feedback variable.

12. The method of claim 11, where the feed forward variable is based on a requested torque converter slip and a requested vehicle speed.

13. The method of claim 12, where the vehicle speed error is a difference between the actual vehicle speed and a requested vehicle speed, where the requested vehicle speed is based on the accelerator pedal position.

14. The method of claim 11, where the feedback variable is based on the vehicle speed error and the torque converter slip error.

15. The method of claim 14, where the torque converter slip error is a difference between actual torque converter slip and a requested torque converter slip, and where the requested torque converter slip is based on the accelerator pedal position.

16. A system, comprising:
an engine;
a torque converter including a torque converter clutch, the torque converter coupled to the engine; and
a controller including executable instructions stored in non-transitory memory to adjust engine torque and a torque capacity of the torque converter clutch based on a feed forward adjustment and a feedback adjustment, the feedback adjustment based on minimizing a cost function comprising a torque converter slip error and a vehicle speed error.

17. The system of claim 16, where the feed forward adjustment is based on a requested torque converter slip and a requested vehicle speed.

18. The system of claim 17, where the cost function includes two integrations.

19. The system of claim 18, where the torque converter slip error is a difference between actual torque converter slip and a requested torque converter slip.

* * * * *